(12) United States Patent
Pegg et al.

(10) Patent No.: US 9,214,719 B2
(45) Date of Patent: Dec. 15, 2015

(54) HANDHELD DEVICE AND METHOD OF MANUFACTURE THEREOF

(71) Applicant: BLACKBERRY LIMITED, Waterloo (CA)

(72) Inventors: Albert Murray Pegg, Breslau (CA); Eric Gary Malo, Waterloo (CA); Darren Reader, Kitchener (CA); Rayhan Behin, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 234 days.

(21) Appl. No.: 14/089,172

(22) Filed: Nov. 25, 2013

(65) Prior Publication Data

US 2015/0145730 A1  May 28, 2015

(51) Int. Cl.
*H01Q 1/24* (2006.01)
*H04M 1/02* (2006.01)
*H01Q 1/38* (2006.01)
*H01Q 7/00* (2006.01)
*H01Q 7/06* (2006.01)

(52) U.S. Cl.
CPC ............. *H01Q 1/243* (2013.01); *H01Q 1/38* (2013.01); *H01Q 7/00* (2013.01); *H01Q 7/06* (2013.01); *H04M 1/026* (2013.01); *H04M 1/0277* (2013.01)

(58) Field of Classification Search
USPC ........................ 343/700 MS, 702, 878, 873
See application file for complete search history.

(56) References Cited

U.S. PATENT DOCUMENTS

| | | | |
|---|---|---|---|
| 8,482,478 B2 | 7/2013 | Hartenstein | |
| 8,907,850 B2 * | 12/2014 | Schlub | H01Q 1/243 343/700 MS |
| 2008/0318447 A1 * | 12/2008 | Tomioka | H01Q 1/2258 439/76.1 |
| 2009/0085812 A1 | 4/2009 | Qi et al. | |
| 2009/0167620 A1 | 7/2009 | Ha et al. | |
| 2011/0254741 A1 * | 10/2011 | Ishimiya | H01Q 1/243 343/702 |
| 2012/0214412 A1 | 8/2012 | Schlub et al. | |
| 2013/0093388 A1 | 4/2013 | Partovi | |

OTHER PUBLICATIONS

European Extended Search Report; Application No. 14194745.7; Mar. 30, 2015; 7 pages.

* cited by examiner

*Primary Examiner* — Tan Ho
(74) *Attorney, Agent, or Firm* — Conley Rose, P.C.; J. Robert Brown, Jr.

(57) ABSTRACT

A handheld device comprises a casing acting as a protective supporting framework of the handheld device. A circuit board mechanically supports and electrically connects with each other electronic components of the handheld device and is configured to be embedded into the casing. At least one wireless communications circuit transmits signals and data from the handheld device and is carried by the circuit board. A flex-antenna assembly is electrically coupled to the wireless communications circuit for sending and receiving the signals and data, defines flexible dielectric and conductive layers of the flex-antenna assembly disposed adjacent to each other, and is embedded into the circuit board.

20 Claims, 5 Drawing Sheets

HANDHELD DEVICE AND METHOD OF MANUFACTURE THEREOF

BACKGROUND

There is continuous and extensive demand for a handheld device, such as a portable electronic device (PED), that is easier and more convenient for users thereof to carry and use it. Toward this end, it is desired that size, weight, and dimension of the PED be reduced and its components to be made of material or materials that allow(s) such reduction. And, since a thick stack-up of the PED can especially negatively affect mechanical dimensions of the PED, a thinner such stack-up is especially desired in this regard. However, there is concern that such reduction lowers the performance of the PED and involves more complicated technologies, methods, and processes for assembly it. As a result, the design of the PED for providing its desired performance within the relatively limited amount of space available poses a challenge.

Accordingly, there is a need to reduce in size, weight, and dimension the PED such that it is easier and more convenient for users thereof to carry and use the PED. More specifically, there is a need to reduce the thickness of the PED by normal processes while providing the desired performance of the PED.

BRIEF DESCRIPTION OF FIGURES OF DRAWING

For a more complete understanding of this disclosure, reference is now made to the following brief description, taken in connection with the accompanying drawing and detailed description, wherein like reference numerals represent like parts.

DETAILED DESCRIPTION

It should be understood at the outset that although illustrative implementations of at least one exemplary aspect or embodiment of the present disclosure are provided below, the disclosed systems and/or methods may be implemented using any number of techniques, whether currently known or in existence. The disclosure should in no way be limited to the illustrative exemplary implementations, designs, and techniques illustrated and described herein, but may be modified within the scope of the appended claims along with their full scope of equivalents.

Figure 1A:
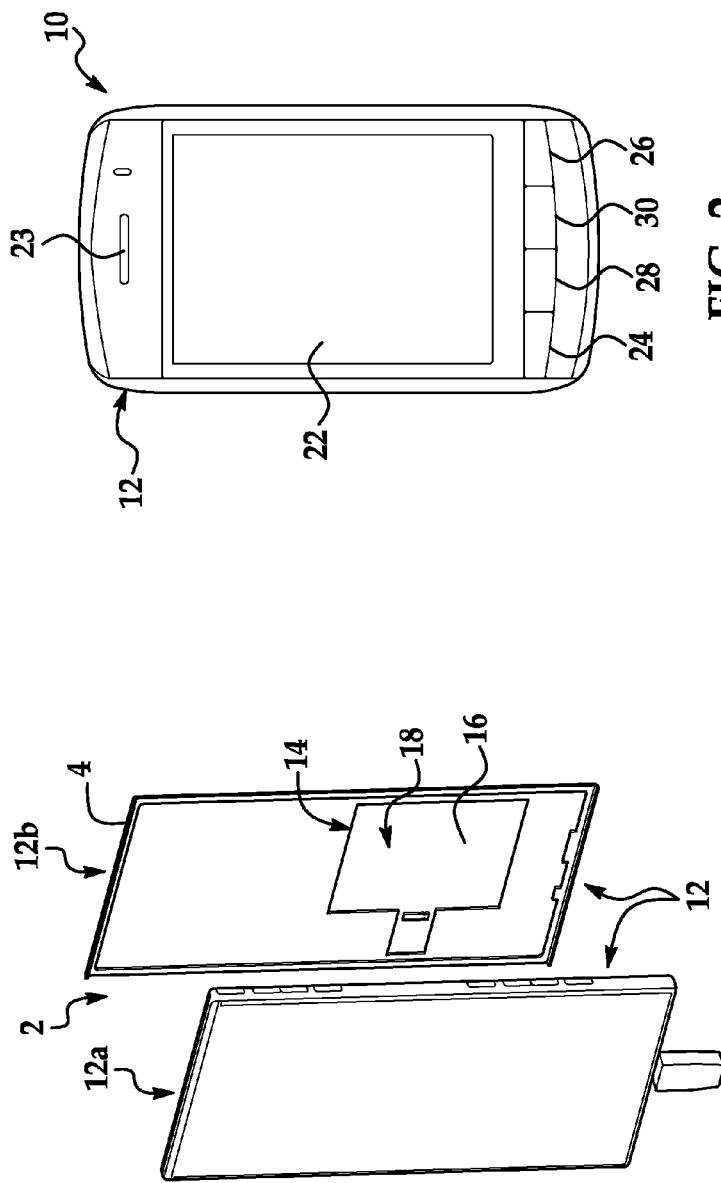
FIG. 1A is a schematic perspective view of a "flex stack-up" of a portable electronic device (PED) with which concepts of the present disclosure can be practiced showing a rear cover of a housing or casing of the PED decoupled from a remainder of the casing.

Referring to the figures, a handheld device, such as a portable electronic device (PED), is generally indicated at 2 in FIG. 1A. The PED 2 supports implementations, designs, and techniques described below and illustrated herein, and concepts of the present disclosure can be practiced with the PED 2.

Referring specifically to FIG. 1A, the PED 2 generally includes, among other structural components, a portable external housing or casing 12, generally indicated at 12, that acts as a protective supporting framework of the PED 2 and defines a front, generally indicated at 12a, and rear, generally indicated at 12b, of the casing 12. The rear 12b of the casing 12 defines a rear door, surface, or cover 4 (hereinafter referred to as merely "the rear cover 4") of the casing 12 or even defines a rear of the PED 2 itself. A circuit board 14 mechanically supports and electrically connects with each other electronic components of the PED 2 and is carried by the casing 12 and either spaced from or carried by the rear cover 4. For instance, the circuit board 14 can be operatively coupled to a liquid-crystal display (LCD), a microphone, a battery, a speaker, a keyboard, a display, control keys, and/or various inputs/outputs of the PED 2. In an exemplary embodiment, the circuit board 14 is a printed circuit board (PCB) 14 or flexible PCB (FPC) and can include capacitors, resistors, and other components.

At least one wireless communications circuit 16 transmits signals or data from the PED 2 using radio-frequency, infrared, microwave, or other types of electromagnetic or acoustic waves. A flex-antenna assembly, generally indicated at 18, includes at least one antenna for sending and receiving the electromagnetic or acoustic waves. More specifically, the flex-antenna assembly 18 can be carried on at least one surface of an antenna-carrier frame (not shown) and includes flexible dielectric layers and conductive layers disposed between adjacent flexible dielectric layers. The conductive layers are electrically coupled to the wireless communications circuit 16 for sending and receiving the signals and data. The wireless communications circuit 16 and antenna assembly 18 are carried by the rear cover 4 as well. A chord 5 extends from a bottom edge of the front 12a of the casing 12 and provides electrical power to the PED 2.

In an exemplary embodiment, the wireless communications circuit 16 is a "near-field communications (NFC)" circuit 16. However, it should be appreciated that the wireless communications circuit 16 can be a satellite-positioning-system circuit, a cellular-communication circuit, a wireless-local-area-network (WLAN) circuit (WLC), a "Bluetooth" circuit, or the like.

Figure 1B:
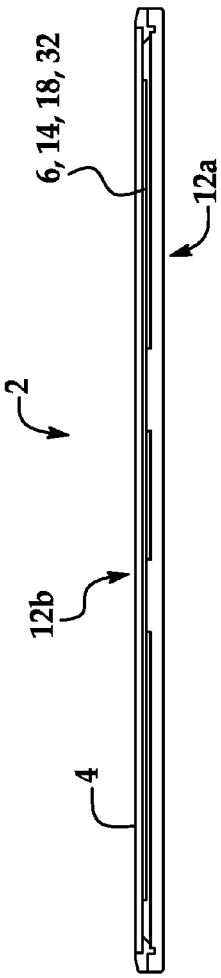
FIG. 1B is a schematic side view of the "flex stack-up" of the PED illustrated in FIG. 1A showing a thickness defined by the "flex stack-up."

Referring specifically to FIG. 1B, at least part of the flex-antenna assembly 18 includes ferrite 32 for providing inductive shielding to the flex-antenna assembly 18. Also, a pressure-sensitive layer of adhesive 6 secures the flex-antenna assembly 18 to the rear cover 4 of the casing 12. In particular, the pressure-sensitive-adhesive layer 6 can secure the flexible dielectric layers and conductive layers to the antenna-carrier frame. The flex-antenna assembly 18 can include also a respective adhesive layer (not shown) coupling each conductive layer to an adjacent flexible dielectric layer. Furthermore, the flex-antenna assembly 18 defines a surface area for "performance" characteristics of the PED 2, in general, and the flex-antenna assembly 18, in particular.

It should be appreciated that the handheld device 2, in general, and PED 2, in particular, can be any suitable such device, like a mobile wireless communications device (e.g., a cellular telephone). Also, the circuit board 14 can be any suitable circuit board, and the wireless communications circuit 16 can be any suitable wireless communications circuit. Furthermore, any suitable material can be included for providing inductive shielding to the flex-antenna assembly 18. In addition, any suitable adhesive can secure the flex-antenna assembly 18 to the rear cover 4 of the casing 12 and couple each conductive layer to an adjacent flexible dielectric layer.

Still referring to FIG. 1B, a combination of the rear cover 4, PCB 14, flex-antenna assembly 18, ferrite 32, and adhesive 6 defines a thickness of the combination. For example, the rear cover 4 can be made of woven glass fiber and about 0.55 mm thick, the PCB 14 can be about 0.18 mm thick, the flexible-antenna assembly 18 in conjunction with the ferrite 32 can be about 0.27 mm thick, and the adhesive 6 can be about 0.05 mm thick. A sum of these thicknesses is about 1.05 mm. However, the "0.87 mm" thickness of the combination of the rear cover 4, flex-antenna assembly 18, ferrite 32, and adhesive 6 may not provide the "performance" characteristics desired for the PED 2. In particular, the "0.32 mm" thickness of the combination of the flex-antenna assembly 18, ferrite 32, and adhesive 6 may not provide such characteristics. In fact, performance of the combination of the flex-antenna assembly 18, ferrite 32, and adhesive 6 is expected to be low. Yet, increasing the thickness of the flex-antenna assembly 18 to provide such "performance" characteristics increases the thickness of the PED 2 and is, thus, not a solution.

Also, not only does a thick "NFC/WLC" stack-up of the PED 2 negatively affect mechanical dimensions of the PED 2, but also a thinner such stack-up involves more complicated technologies, methods, and processes of assembly of the PED 2. More specifically, it is desired to have a great amount of copper for a coil or coils of the antenna assembly 18 while maintaining control of the thickness of the coil(s). With that said, the WLC requires a low amount of direct-current resistance (DCR), which implies a thick amount of copper. For example, the "resistance" target is about 0.5 ohm, and the WLC requires a thickness of copper of typically about 100 micrometers. Yet, normal "PCB" processes involve a thickness of the copper of about 35 micrometers or about 1 ounce of the copper. Therefore, the thickness of about 100 micrometers is too great for normal processes such that moving to 100 micrometers is not economical and/or has drastic downside for manufacturing tolerance. So, having a great amount of the copper for the coil or coils while maintaining control of the thickness of the coil(s) is difficult to accomplish over a single "100 micrometer" layer of copper.

Referring now to FIGS. 2 through 4B, a handheld device according to an exemplary embodiment is generally indicated at 10. In the exemplary embodiment, the handheld device 10 is a portable electronic device (PED) 10.

The concepts described in further detail below may be applied with a variety of devices, and the concepts are not restricted to application with the illustrative PED 10. The PED 10 includes data-communication capabilities and may communicate with other electronic devices directly or through a wireless network. The PED 10 is based upon a computing environment and functionality of a handheld computer, such as a wireless personal digital assistant (PDA). It should be appreciated, however, that the PED 10 is not limited to a wireless PDA and other PEDs—such as (but not limited to) cellular telephones, smart telephones, electronic messaging devices, and laptop computers—are possible.

Figure 2:
FIG. 2 is a front view of a PED in accordance with one exemplary aspect or embodiment.
Figure 3A:
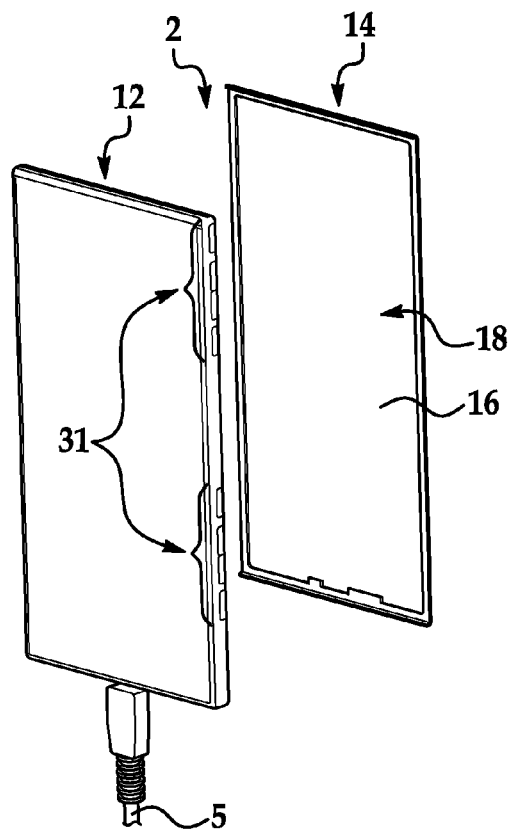
FIG. 3A is a schematic perspective view of a "PCB stack-up" of the PED illustrated in FIG. 2 showing a printed circuit board (PCB) configured as a rear cover of a housing or casing of the PED and decoupled from a remainder of the casing.
Figure 3B:
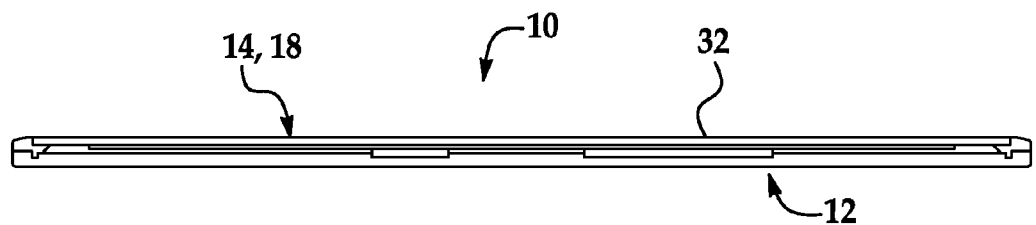
FIG. 3B is a schematic side view of the "PCB stack-up" of the PED illustrated in FIG. 3A showing a thickness defined by the "PCB stack-up" that is lesser than that defined by the "flex stack-up" of FIG. 1B.

Referring now to FIGS. 2, 3A, and 3B, the PED 10 illustratively comprises, in general, a portable external housing or casing, generally indicated at 12, that acts as a protective supporting framework of the PED 10 and defines a front and rear of the casing 12. A circuit board, generally indicated at 14, is configured to be embedded into the casing 12 as an integral part of the casing 12. In an exemplary embodiment, the circuit board 14 includes capacitors, resistors, and other components (not shown). The circuit board 14 mechanically supports and electrically connects with each other electronic components of the PED 10.

For instance, referring specifically to FIG. 2, the PED 10 illustratively comprises also a liquid-crystal display (LCD) 22, a microphone (not shown), a battery (not shown), a speaker 23, a keyboard (not shown), a plurality of control keys (including, by way of example only, an "off hook" key 24 to initiate a phone call, an "on hook" key 26 to discontinue the phone call, a "menu" key 28, a "return" or "escape" key 30, and "on/off" and "volume level" keys, generally indicated at 31), and/or various inputs/outputs of the PED 10. The circuit board 14 is operatively coupled to the LCD 22, microphone, battery, speaker 23, keyboard, control keys 24, 26, 28, 30, and/or various inputs/outputs. Operation of the LCD 22, microphone, battery, speaker 23, keyboard, control keys 24, 26, 28, 30, and/or various inputs/outputs should be appreciated and, thus, are not described further herein.

At least one wireless communications circuit 16 transmits signals or data from the PED 10 using radio-frequency, infrared, microwave, or other types of electromagnetic or acoustic waves. A flex-antenna assembly, generally indicated at 18, includes at least one antenna for sending and receiving the electromagnetic or acoustic waves, is electrically coupled to the wireless communications circuit 16, defines a plurality of layers, generally indicated at 20 in FIG. 4A, of the flex-antenna assembly 18, and is embedded into the circuit board 14 as an integral part of the circuit board 14. With respect to the layers 20, the flex-antenna assembly 18 includes flexible dielectric and conductive layers 20 disposed adjacent to each other. The conductive layer(s) 20 is/are electrically coupled to the wireless communications circuit 16 for sending and receiving the signals and data.

It should be appreciated that the wireless communications circuit 16 can be a satellite-positioning-system circuit, a cellular-communication circuit, a wireless-local-area-network (WLAN) circuit (WLC), a "Bluetooth" circuit, a code-division-multiple-access (CDMA), or even an NFC circuit and wireless charging.

Referring specifically to FIGS. 3A and 3B, in the exemplary embodiment, the circuit board 14 is integrated or embedded into the casing 12. In this way, the circuit board 14 is configured to be a rear surface 14 of the casing 12 or of the PED 10 itself. Alternatively, the circuit board 14 is configured to be a door 14 or supporting structure of the casing 12 or of the PED 10 itself. Also, the circuit board 14 is a printed circuit board (PCB) 14. Stiffness of a rigid PCB 14 acts as the supporting structure. A chord 5 extends from a bottom edge of the casing 12 and provides electrical power to the PED 10.

It should be appreciated that, other than the PCB 14 being at least an integral part of the casing 12, the PCB 14 can have any suitable relationship with the casing 12.

At least part of the flex-antenna assembly 18 includes ferrite 32 for providing inductive shielding to the flex-antenna assembly 18. The ferrite 32 is adhesively applied to the PED 10.

A combination of the PCB 14 and flex-antenna assembly 18 with the ferrite 32 defines a thickness of the combination of no greater than about 0.80 mm. This is in contrast to about 1.00 mm that otherwise would be so defined without the circuit board 14 being the rear surface 14, door 14, or supporting structure of the casing 12 or of the PED 10 itself.

It should be appreciated that any suitable amount of the ferrite 32 can be included on any suitable part of the flex-antenna assembly 18. Also, the flex-antenna assembly 18 can include any suitable material for providing the inductive shielding to the flex-antenna assembly 18. Furthermore, the thickness of the combination can be any relatively thin distance.

Figure 4A:
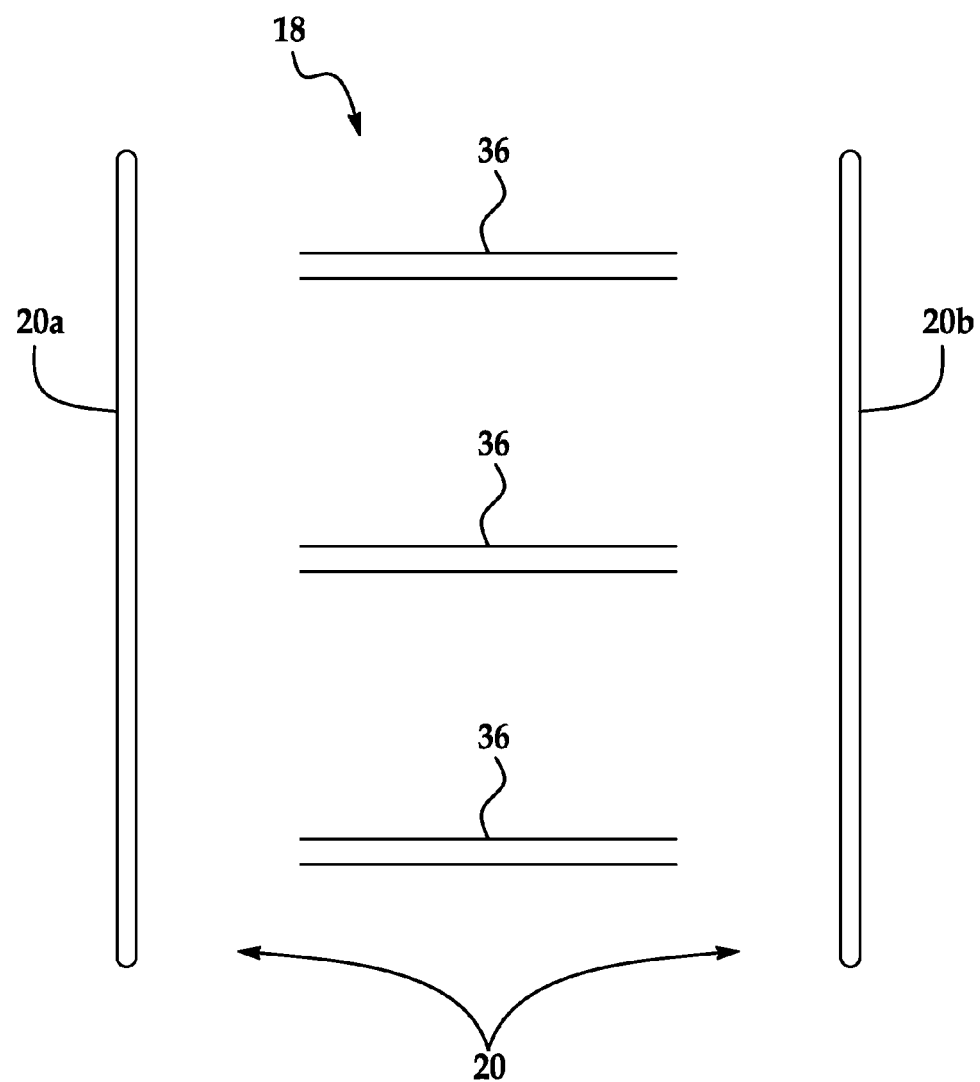
FIG. 4A is an exploded side view of top and bottom layers of the flex-antenna assembly of the PED illustrated in FIGS. 2 through 3B showing connection of the layers to each other by a plurality of vias.
Figure 4B:
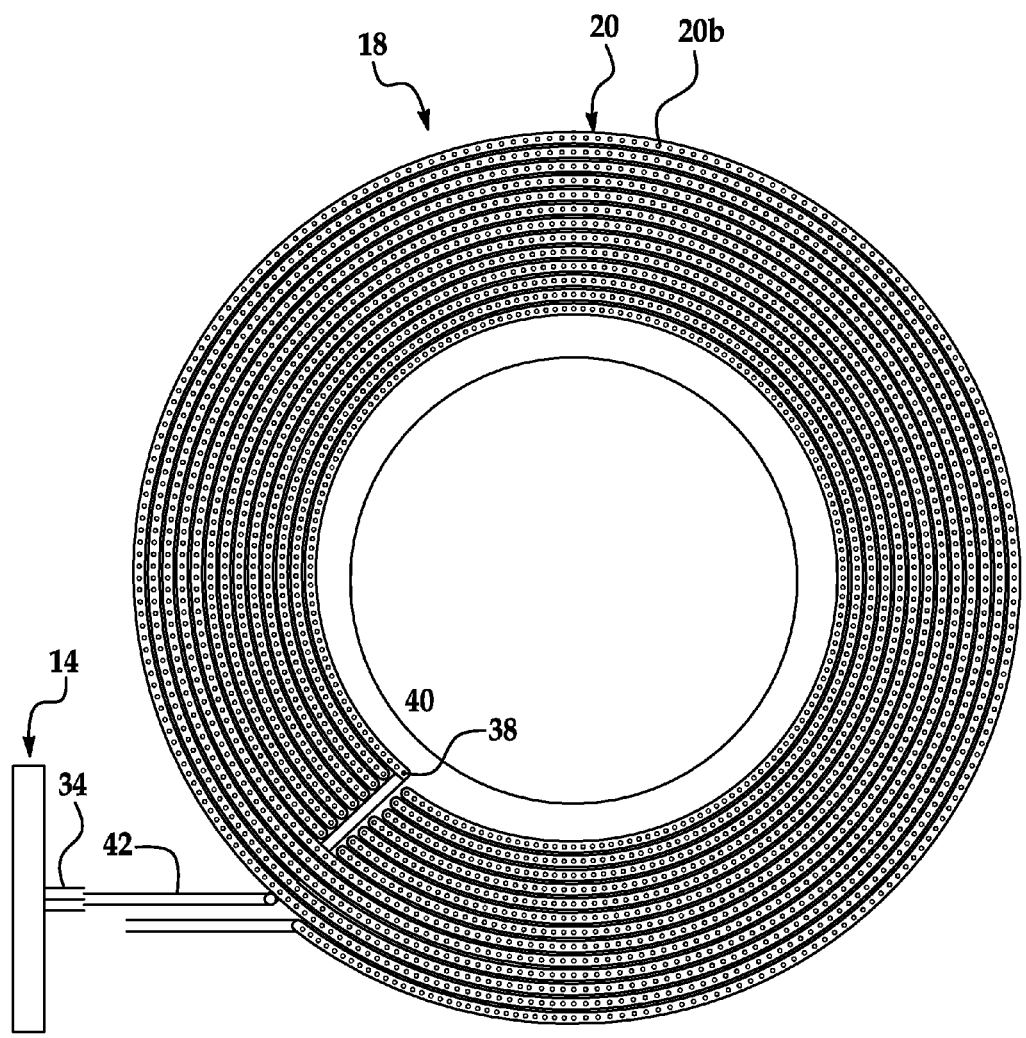
FIG. 4B is a top view of the bottom layer of the flex-antenna assembly of the PED illustrated in FIGS. 2 through 3B.

Referring specifically to FIGS. 4A and 4B, in the exemplary embodiment, the flex-antenna assembly 18 defines a top layer, generally indicated at 20a, stacked-up on a bottom layer, generally indicated at 20b, of the flex-antenna assembly 18 and includes a respective pair of copper coils 20a, 20b. In particular, the flex-antenna assembly 18 includes a stacking-up of the two copper layers 20a, 20b of NFC and WLC antennas 20 with each other.

Also, a plurality of Pogo pins 34 define a contact area 34 of the PCB 14 located outside of the coils 20a, 20b. And, the coils 20a, 20b are connected to each other by a plurality of vias 36. Furthermore, the coils 20a, 20b define an inner end 38 of the coils 20a, 20b that is routed to a substantially central area 40. In addition, only one of the layers 20a, 20b enables a trace 42 that runs out from the central area 40 and defines a channel 42 for accessing the Pogo pins 34 and bridging the inner end 38 to the contact area 34. In FIG. 4B, the trace 42 is shown enabled by the bottom layer 20b. Moreover, each of the pair of coils 20a, 20b defines a track width of the coil 20a, 20b of about 500 micrometers.

With respect to construction of the copper coils 20a, 20b, a layer of copper coil 20 is split into two layers 20a, 20b of the respective copper coils 20a, 20b such that normal processes can still be used to combine the NFC and WLC antennas 20a, 20b with each other as a thin stack-up. More specifically, a substantially 100-micrometer layer of copper coil is split into two substantially 50-micrometer layers 20a, 20b. Processing two 50-micrometer layers 20a, 20b separately is much easier than processing a single 100-micrometer layer. And, having a great amount of copper for the coil(s) 20a, 20b of the flex-antenna assembly 18 while maintaining control of the thickness of the coil(s) 20a, 20b is more manageable with two 50-micrometer layers 20a, 20b. Therefore, splitting heavy copper between two layers 20a, 20b allows for a "normal processing" range to be reached.

Furthermore, with careful planning and "layout" control, the two-layer stack-up can be maintained. In addition, any higher resistances resulting from thinner wire can be accounted for at the "system" level. Moreover, the two-layer coil 20a, 20b applied in the context of the PCB 14 has an advantage over, for instance, a wire cable in that the PCB 14 can be selectively made thinner over the wire cable and not have any sections of the PCB 14 that are effectively "double" to allow the inner coil 20a or 20b to be routed to the external contact area 34 where the wires 20a, 20b crossover.

It should be appreciated that the flex-antenna assembly 18 can define any suitable number of layers 20 of the flex-antenna assembly 18. For example, the flex-antenna assembly can define a third layer (not shown) configured to route the inner end 38 of the coil 20a, 20b, which is routed to the substantially central area 40, to the contact area 34. Also, the top and bottom layers 20a, 20b of the flex-antenna assembly 18 can have any suitable relationship with each other. Furthermore, the PCB 14 can include any suitable number of Pogo pins 34 and any suitable structure can define the contact area 34. In addition, the PED 10 can include any suitable number of vias 36 and the coils 20a, 20b can be connected with each other by any suitable structure. Moreover, each of the pair of coils 20a, 20b can define a track width of the coil 20a, 20b of any suitable length.

In the exemplary embodiment, the PCB 14 is made of copper foil, woven fiberglass cloth with an epoxy resin, and solder mask that allow a suitably rigid structure while reducing overall thickness of the PED 10 due to embedding the PCB 14 into the casing 12. However, it should be appreciated that the PCB 14 can be made of any suitable material, such as resin-coated copper (RCC) and polymide (PI).

Figure 5:
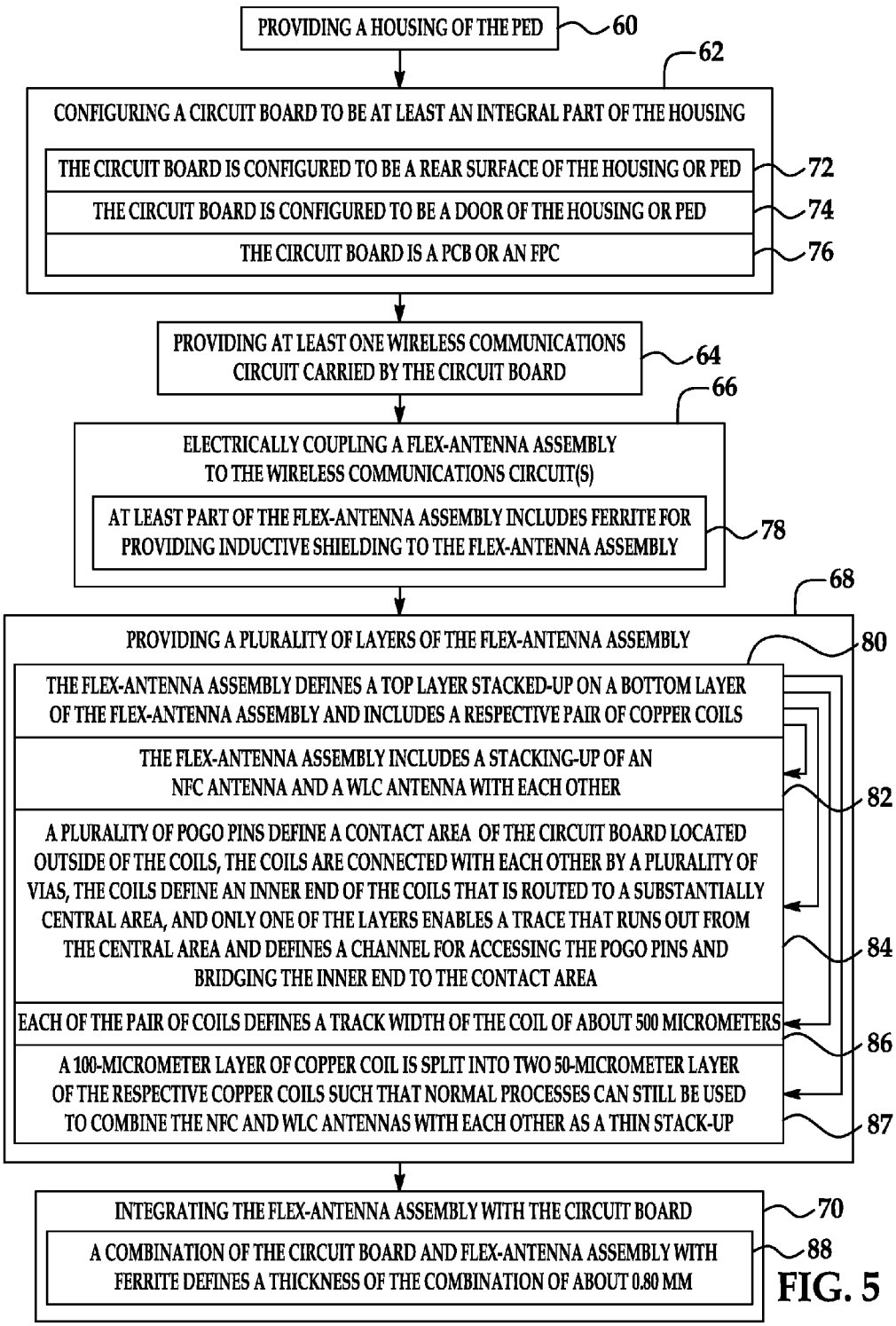
FIG. 5 is a flow diagram showing a method of manufacturing the PED illustrated in FIGS. 2 through 4B.

Referring specifically to FIG. 5, in an exemplary embodiment, a method of manufacturing the PED 10 is shown. In general, at step 60 of the method, a housing or casing 12 of the PED 10 is provided. At step 62, a circuit board 14 is configured to be at least an integral part of the casing 12. At step 64, at least one wireless communications circuit 16 carried by the circuit board 14 is provided. At step 66, a flex-antenna assembly 18 is electrically coupled to the wireless communications circuit 16. At step 68, a plurality of layers 20 of the flex-antenna assembly 18 are provided. At step 70, the flex-antenna assembly 18 is embedded into and, thus, integrated with the circuit board 14.

More specifically, at step 72 of the method, the circuit board 14 is configured to be a rear surface 14 of the casing 12 or PED 10. Alternatively, at step 74, the circuit board 14 is configured to be a door 14 of the casing 12 or PED 10. At step 76, the circuit board 14 is a printed circuit board (PCB) 14 or flexible PCB (FPC) 14. At step 78, at least part of the flex-antenna assembly 18 includes ferrite 32 for providing inductive shielding to the flex-antenna assembly 18. At step 80, the flex-antenna assembly 18 defines a top layer 20a stacked-up on a bottom layer 20b of the flex-antenna assembly 18 and includes a respective pair of copper coils 20a, 20b. At step 82, the flex-antenna assembly 18 includes a stacking-up of the two copper layers 20a, 20b of NFC and WLC antennas 20 with each other.

At step 84, a plurality of Pogo pins 34 define a contact area 34 of the PCB 14 located outside of the coils 20a, 20b, the coils 20a, 20b are connected with each other by a plurality of vias 36, the coils 20a, 20b define an inner end 38 of the coils 20a, 20b that is routed to the substantially central area 40, and only one of the layers 20a, 20b enables a trace 42 that runs out from the central area 40 and defines a channel 42 for accessing the Pogo pins 34 and bridging the inner end 38 to the contact area 34. At step 86, each of the pair of coils 20a, 20b defines a track width of the coil 20a, 20b of about 500 micrometers. With respect to construction of the copper coils 20a, 20b, at step 87, a 100-micrometer layer of copper coil is split into two 50-micrometer layers 20a, 20b of the respective copper coils 20a, 20b such that normal processes can still be used to combine the NFC and WLC antennas 20a, 20b with each other as the thin stack-up. At step 88, a combination of the PCB 14 and flex-antenna assembly 18 with the ferrite 32 defines a thickness of the combination of no greater than about 0.80 mm.

As a result of the PED 10 and method of manufacturing the PED 10, the NFC and WLC antennas 20a, 20b are integrated into the PCB 14, which is configured to be the rear cover 14 of the casing 12 or PED 10. In this way, the NFC and WLC antennas 20a, 20b are integrated in a "thin form" factor, and the PCB 14 serves dual uses, including meeting certain functional criteria that a typical casing of a PED is required to satisfy—e.g., sufficient rigidity, shock resistance, hardness, etc. As such, the thickness of the combination of the PCB 14, NFC and WLC antennas 20a, 20b, and ferrite 32 is reduced by normal processes over the thickness of the rear cover 4, PCB 14, NFC and WLC antennas 18, ferrite 32, and adhesive 6 of the PED 2 by about 0.42 mm. Yet, the thickness of the PED 10 is still sufficient for the NFC and WLC antennas 20a, 20b to perform properly, and the desired "performance" characteristics of the PED 10 are achieved.

In view of the thin stack-up of the PED 10 using normal processes, the PED 10 is reduced in size, weight, and dimension (space) relative to the PED 2. In this way, it is easier and more convenient for users of the PED 10 to carry and use the PED 10.

While several exemplary embodiments have been provided in the present disclosure, it should be understood that the disclosed systems and methods may be embodied in many other specific forms without departing from the spirit or scope of the present disclosure. The examples of the present disclosure are to be considered as illustrative and not restrictive, and the intention is not to be limited to the details given herein. For example, the various elements or components may be combined or integrated with another system, or certain features may be omitted or not implemented.

Also, techniques, systems, sub-systems, modules, and methods described and illustrated in the various exemplary embodiments as discrete or separate may be combined or integrated with other techniques, systems, sub-systems, modules, or methods without departing from the scope of the present disclosure. Other items shown or discussed as coupled or directly coupled or communicating with each other may be indirectly coupled or communicating with each other through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A handheld device comprising:
   a casing that acts as a protective supporting framework of the handheld device;
   a circuit board that mechanically supports and electrically connects with each other electronic components of the handheld device and is configured to be embedded into the casing;
   at least one wireless communications circuit that transmits signals and data from the handheld device and is carried by the circuit board; and
   a flex-antenna assembly that is electrically coupled to the wireless communications circuit for sending and receiving the signals and data, defines flexible dielectric and conductive layers of the flex-antenna assembly disposed adjacent to each other, and is embedded into the circuit board.

2. The handheld device of claim 1, wherein the circuit board is configured to be a rear surface of either of the casing and handheld device.

3. The handheld device of claim 1, wherein the circuit board is configured to be a door of either of the casing and handheld device.

4. The handheld device of claim 1, wherein the circuit board is a printed circuit board (PCB).

5. The handheld device of claim 1, wherein the handheld device comprises further a display and a plurality of control keys and the circuit board is operatively coupled to the display and control keys.

6. The handheld device of claim 1, wherein the circuit board is made of copper foil, woven fiberglass cloth with an epoxy resin, and solder mask that allow a suitably rigid structure.

7. The handheld device of claim 1, wherein the circuit board is made of resin-coated copper (RCC) and polymide (PI).

8. The handheld device of claim 1, wherein the wireless communications circuit is electrically coupled to the conductive layer.

9. The handheld device of claim 1, wherein the wireless communications circuit is any of a satellite-positioning-system circuit, a cellular-communication circuit, a wireless-local-area-network (WLAN) circuit (WLC), a "Bluetooth" circuit, a code-division-multiple-access (CDMA) circuit, and an NFC circuit and wireless charging.

10. The handheld device of claim 1, wherein at least part of the flex-antenna assembly includes ferrite for providing inductive shielding to the flex-antenna assembly.

11. The handheld device of claim 10, wherein the ferrite is adhesively applied to the flex-antenna assembly.

12. The handheld device of claim 10, wherein a combination of the circuit board, flex-antenna assembly, and ferrite defines a thickness of the combination of no greater than about 0.80 mm.

13. The handheld device of claim 1, wherein the flex-antenna assembly defines a top layer stacked-up on a bottom layer of the flex-antenna assembly and includes a respective pair of copper coils.

14. The handheld device of claim 13, wherein the flex-antenna assembly includes a stacking-up of NFC (near-field communication) and WLC (wireless charging) antennas with each other.

15. The handheld device of claim 14, wherein a layer of copper coil is split into two layers of the respective copper coils such that normal processes can still be used to combine the NFC and WLC antennas with each other as a thin stack-up.

16. The handheld device of claim 15, wherein a substantially 100-micrometer layer of copper coil is split into two substantially 50-micrometer layers.

17. The handheld device of claim 13, wherein a plurality of Pogo pins define a contact area of the circuit board located outside of the coils, the coils are connected to each other by a plurality of vias, the coils define an inner end of the coils that is routed to a substantially central area, and only one of the layers enables a trace that runs out from the central area and defines a channel for accessing the Pogo pins and bridging the inner end to the contact area.

18. The handheld device of claim 13, wherein each of the pair of coils defines a track width of the coil of about 500 micrometers.

19. The handheld device of claim 1, wherein the handheld device is a portable electronic device (PED).

20. The handheld device of claim 19, wherein the PED is any of a wireless personal digital assistant (PDA), cellular telephone, smart telephone, electronic messaging device, and laptop computer.

* * * * *